United States Patent Office 2,967,092
Patented Jan. 3, 1961

2,967,092

COLORIMETRIC DETERMINATION OF DISSOLVED OXYGEN IN LOW CONCENTRATIONS

Leonard S. Buchoff, Pittsburgh, Pa. (6 Elmbrook Place, Bloomfield, N.J.), and Nathan M. Ingber, Park Forest, Ill. (1467 Benner St., Philadelphia 49, Pa.)

No Drawing. Continuation of application Ser. No. 429,417, May 12, 1954. This application May 13, 1957, Ser. No. 658,899

13 Claims. (Cl. 23—230)

(Granted under Title 35, U.S. Code (1952), sec. 266)

The invention described herein may be manufactured and used by or for the Government of the United States of America for governmental purposes without the payment of any royalties thereon or therefor.

The present invention relates generally to the determination of dissolved oxygen in a liquid; and more particularly relates to the determination of the concentration of oxygen dissolved in minute amounts in water, such as boiler feed water.

The present application is a continuation of application Serial No. 429,417, filed May 12, 1954, now abandoned, by the same inventors.

Generally, the determination of the concentration of oxygen dissolved in water depends upon colorimetric tests. In such tests, a reagent is added to the liquid being tested to react with the dissolved oxygen. If any oxygen is present in the water, the reagent reacts with the oxygen in a manner to produce a visible color. The amount of dissolved oxygen present can then be determined by noting the shading or the intensity of the color produced. Colorimetric tests such as the Winkler and others wherein a reagent is used, are generally satisfactory when the amount of gas dissolved in a liquid is relatively large.

The prior art colorimetric methods, however, do not possess sufficient sensitivity, discernibility, or reliability for detecting dissolved oxygen when the concentration is less than 0.02 part per million (p.p.m.). Deaerators now commercially available and widely used in boiler feed water systems reduce the dissolved oxygen concentration to about 0.014 p.p.m.

The reliability, discernibility and sensitivity of present colorimetric testing systems are not great enough to get accurately reproduceable results for determining dissolved oxygen in such low concentrations. For example, when sensitized pyrol gallol is used, that is, a solution of pyrol gallol reagent and potassium hydroxide, fair sensitivity can be obtained; but with exposure to air, the sensitivity of the reagent changes and the colors fade rapidly. Consequently, the colorimetric prior art methods for analyzing water are not useful in determining dissolved oxygen content in connection with boiler feed water treated by deaerators.

In the present invention, not only is good sensitivity obtained for determining dissolved oxygen in a range below about 0.020 p.p.m., but also the colors obtained are stable for at least 45 minutes and the reagent is stable in the presence of air.

It is an object of this invention to provide a stable composition for quickly and reliably determining the quantity of dissolved oxygen in low concentrations in a liquid.

It is another object of this invention to provide a stable composition that can be used by untrained personnel for determining the quantity of dissolved oxygen in water by a colorimetric test.

It is a further object of this invention to provide a simple, rapid and accurate test means for determining the presence of oxygen in water such as boiler feed water.

It is still another object of this invention to provide a reagent useful for determining the quantity of dissolved oxygen in water such as boiler feed water.

Other objects and many of the attendant advantages of this invention will be readily appreciated as the same becomes better understood by reference to the following detailed description.

In accordance with the present invention, indigo carmine in a solution of a strong alkali, such as potassium hydroxide, is used in the reagent. In preliminary studies indigo carmine, a water soluble dye, was reduced to its leuco base in alkali media and added to water samples containing dissolved oxygen. The reaction of oxygen with the chemical under these conditions yielded colors from yellow-green, to red, to blue depending upon the oxygen content. The concentration of alkali has a strong influence on the stability of the leuco form and on the colors developed. A concentration of KOH was selected which produced clear, well defined colors at low concentrations of oxygen (approximately 0.005 p.p.m.). The leuco base of indigo carmine has been found to be stable in this solution even in the presence of air. With less alkali, the indigo carmine oxidizes rapidly in air so that it is extremely unstable. More alkali gives indistinct colors in dissolved oxygen tests. This means that the proportion of KOH in the reagent is fairly critical and should be held within a narrow range.

The reagent used in this invention is made by dissolving 0.018 gram of indigo carmine, 0.2 gram of glucose and enough water, preferably distilled, to bring the total volume of the solution to 5 cc. and subsequently adding 75 cc. of glycerine and 20 cc. of 37½% potassium hydroxide solution i.e. 8.4 gms. KOH dissolved in 20 cc. of distilled water. This makes a total solution of 100 cc. The leuco base is first formed by mixing fixed proportions of the two solutions (the alkali and the glucose-indigo carmine mixture) and allowing the resulting liquid to stand for 10 minutes in a closed container. A reduction takes place and the color of the liquid mixture will change from a dark red to a light yellow color.

Instead of glucose, other reducing agents such as sodium thiosulphate, potassium metabisulphate, and hydroquinone, can be used.

As a substitute for glycerine, other water miscible substances such as ethylene glycol, diethylene glycol, propylene glycol, or tetrahydro-furfuryl alcohol can be used.

For potassium hydroxide, other equivalent strong alkalis may be substituted such as sodium hydroxide or lithium hydroxide. As soon as the indigo carmine is reduced in the alkali, lemon yellow color will result and the solution is ready for use as the reagent.

Preferably 1 cc. of the reagent solution is used for every 75 cc. sample of water to be tested. If kept at room temperatures the reagent solution will be in usable condition for about 24 hours. If the solution is kept refrigerated, satisfactory tests can be made up to five days from the time it was prepared.

Tests for dissolved oxygen with this reagent are relatively simple. The reduced reagent is added to the test water in a suitable tube such as for example, a glass stoppered Nessler tube. The tube is stoppered and shaken, and the resulting color is compared with the standard color tubes representing various concentrations of oxygen. The color developed is stable for at least 45 minutes in the stoppered tube.

The sampling tube must be of a construction to permit taking of a representative sample and yet it must be constructed to exclude any oxygen intake after the addition of the reagent.

A tube especially useful for the test herein described is described and claimed in the copending patent application, Serial No. 429,416, filed May 12, 1954, now Patent No. 2,929,687, but the test can be carried out in other suitable tubes. For example, if a 60 cc. capacity stoppered Nessler tube is used 0.8 cc. of the reagent is added from a 1.0 cc. tuberculin syringe.

The colors resulting from testing samples of water having various concentrations of dissolved oxygen have been observed and are recorded in Table I illustrated below:

*Table I*

| Concentration $O_2$ in p.p.m.: | Description of color |
|---|---|
| 0.000 | Strong yellow-green. |
| 0.005 | Greenish-yellow. |
| 0.010 | Pinkish-yellow. |
| 0.015 | Reddish-yellow. |
| 0.020 | Orange. |
| 0.030 | Yellowish-pink. |
| 0.050 | Purplish-red. |
| 0.070 | Reddish-purple. |
| 0.090 | Purple. |
| 0.130 | Blue. |
| 0.160 | Bluish-green. |

The determination of oxygen concentration can be made by comparison with a color chart, with colored liquids of the colors mentioned in Table I or the detection can be accomplished electronically with a photoelectric cell similar to that shown in Patent No. 1,919,858.

In order to determine the reproducibility and accuracy of this method of dissolved oxygen, samples of deaerated water were collected and analyzed simultaneously by the indigo carmine method of this invention and by the ASTM Method D888. The oxygen content of the indigo carmine method was determined by comparing the color developed in the sample tube with artificial color standards corresponding to 0.000, 0.005, 0.0010, and 0.015 p.p.m. of dissolved oxygen. These standards were made by blending hydrochloric-acid solutions of ferric chloride and cobalt chloride in varying proportions. Of 34 comparisons made, 33 agreed within 0.004 p.p.m., 26 agreed within 0.002 p.p.m. and 15 agreed with 0.001 p.p.m.

While fair tolerances are permissive in the amounts of the other ingredients of the reagent, the percentage of potassium hydroxide should be held within narrow limits. In the prior description of the compounding of the ingredients for the reagent, 20 cc. of 37½ KOH solution was preferred. The concentration of the KOH solution should be kept within 2½ percent more or less of this value, i.e. 20 cc. of 35 to 40% KOH solution in 100 cc. of reagent.

The strong hydroxide solution results in a very great increase in speed of reduction of the indigo carmine and is also a factor in improving its stability in contact with air. A bottle of reduced indigo carmine in potassium hydroxide can remain uncovered for relatively long periods without reoxidation.

Additionally a much wider range of colors responsive to oxygen content takes place with use of reagent having the potassium hydroxide, as compared for example with a similar reagent using a carbonate. Moreover, the colors obtained are more intense with applicants' reagent using the hydroxide as compared to one using the carbonate.

The glycerine ingredient is important in the reagent in that it increases the speed of formation of the reduced indigo carmine, and results in stability even in air. Without glycerine the reduced indigo carmine is not stable.

The glycerine ingredient is a material factor in the resulting colors indicative of oxygen content which are further improved as to sharpness and brightness. This means that the determination can be made more easily and with reliable results even when made by unskilled workers.

Obviously many modifications and variations of the present invention are possible in the light of the above teachings. It is therefore to be understood, that within the scope of the appended claims which particularly point out the preferred form of the invention, the invention may be practiced otherwise than as specifically described.

What is claimed is:

1. A reagent for determining minute quantities of dissolved oxygen in water, comprising a composition of indigo carmine, glucose, potassium hydroxide and glycerine in proportions equivalent to 0.018 gram of indigo carmine, 0.2 gram of glucose, per hundred cubic centimeters of reagent, the reagent having glycerine and potassium hydroxide in proportions equivalent to 75 cubic centimeters of the glycerine and 20 cubic centimeters of 37½ potassium hydroxide solution.

2. A reagent of a type described comprising glucose, glycerine, indigo carmine and potassium hydroxide in water.

3. A reagent as defined in claim 2 wherein the potassium hydroxide is in the reagent in proportions equivalent to twenty cubic centimeters of 35 to 40 percent potassium hydroxide solution in one hundred cubic centimeters of reagent.

4. A reagent as defined in claim 3 wherein glycerine in the reagent is in proportion equivalent to 75 cubic centimeters of glycerine in 100 cubic centimeters of the reagent.

5. A reagent as defined in claim 3 wherein glucose and indigo carmine in the reagent are in proportion equivalent to 0.2 gram glucose and .018 gram indigo carmine in 100 cubic centimeters of reagent.

6. A reagent as defined in claim 5 wherein glycerine in the reagent is in proportion equivalent to 75 cubic centimeters of glycerine in 100 cubic centimeters of the reagent.

7. A reagent for determining minute quantities of oxygen dissolved in water in concentration of less than .160 part per million, consisting essentially of indigo carmine, glucose, glycerine and potassium hydroxide in water, in proportions equivalent to: five cubic centimeters of water containing .018 gram indigo carmine and 0.2 gram of glucose per hundred cubic centimeters of reagent, the reagent having glycerine and potassium hydroxide in proportions equivalent to 75 cubic centimeters of glycerine, and 20 cubic centimeters of a 35–40 percent solution of potassium hydroxide per hundred cubic centimeters of reagent.

8. A method for determining minute amounts of oxygen dissolved in test water, the oxygen being dissolved in quantities less than .02 part per million, said method comprising mixing the equivalent of: .018 gram of indigo carmine and 0.2 gram of glucose with water to make 5 cubic centimeters of solution, subsequently adding to this solution the equivalent of 75 cubic centimeters of glycerine and 20 cubic centimeters of a 35–40 percent solution of potassium hydroxide, and letting the resultant solution stand for at least a few minutes, then mixing in a closed container the equivalent of one cubic centimeter of said resultant solution with a predetermined amount of the test water to obtain a color indicative of the amount of oxygen dissolved in the water.

9. A reagent of the type described comprising indigo carmine, glucose and potassium hydroxide, the indigo carmine and potassium hydroxide having a ratio of about 1 to 460 by weight, and the indigo carmine and glucose having a ratio of about 1 to 11 by weight.

10. A reagent consisting essentially of the reagent defined in claim 9 with glycerine and water, the glycerine and potassium hydroxide being in proportions equivalent to 75 cubic centimeters of glycerine and 20 cubic centimeters of 35–40 percent potassium hydroxide in 100 cubic centimeters of the first said reagent.

11. A relatively stable reagent for determining minute quantities of oxygen dissolved in water in concentrations of .000 to .160 part per million, consisting essentially of indigo carmine, a reducing agent therefor, glycerine, and potassium hydroxide in water, the reagent having glycerine and potassium hydroxide in proportions equivalent to 20 cubic centimeters of a 35–40 percent solution of potassium hydroxide per hundred cubic centimeters of reagent, a major part of the reagent being glycerine.

12. A relatively stable reagent as defined in claim 11 wherein said glycerine in said reagent is in proportions equivalent to 75 cubic centimeters of glycerine per hundred cubic centimeters of reagent.

13. A relatively stable reagent for determining minute quantities of oxygen dissolved in water in concentrations expressed in parts per million, consisting essentially of indigo carmine, a reducing agent therefor, glycerine, and a hydroxide selected from the group consisting of potassium hydroxide and sodium hydroxide.

References Cited in the file of this patent

UNITED STATES PATENTS 2,606,102   Cook _____ Aug. 5, 1952

OTHER REFERENCES

Efimoff: Bioch. Z., vol. 155, pages 371 to 375, 1925.
Welcher: Organic Anal. Reag., vol. IV, 1948, page 510.
Gregory: Uses and Appl. of Chem. and Related Materials, 1939, pages 300 to 303.
Loomis: Anal. Chem., vol. 26, February 1954, page 402.
Sterens: Anal. Chem., vol. 17, September 1945, page 598.
Jacobs: Handbook of Solvents, 1953, page 415.